United States Patent [19]

Occhini et al.

[11] Patent Number: 4,568,144

[45] Date of Patent: Feb. 4, 1986

[54] OPTICAL FIBER CABLE INCLUDING LAYERS WHICH COMPENSATE FOR THERMAL EXPANSION

[75] Inventors: Elio Occhini; Sergio Longoni, both of Milan, Italy

[73] Assignee: Societa' Cavi Pirelli S.p.A., Milan, Italy

[21] Appl. No.: 636,065

[22] Filed: Jul. 30, 1984

Related U.S. Application Data

[63] Continuation of Ser. No. 298,940, Sep. 3, 1981.

[30] Foreign Application Priority Data

Sep. 29, 1980 [IT] Italy ................. 24982 A/80

[51] Int. Cl.⁴ ......................................... G02B 5/14
[52] U.S. Cl. ........................... 350/96.23; 350/96.10; 174/70 R
[58] Field of Search ................ 350/96.23, 96.10; 174/68 R, 70 R, 70 S

[56] References Cited

U.S. PATENT DOCUMENTS

| | | | |
|---|---|---|---|
| 3,766,307 | 10/1973 | Andrews, Jr. | 174/47 |
| 3,883,218 | 5/1975 | Slaughter | 350/96.23 |
| 4,166,670 | 9/1979 | Ramsay | 350/96.23 |
| 4,232,935 | 11/1980 | Rohner et al. | 350/96.23 |
| 4,312,566 | 1/1982 | Jackson | 350/96.23 |
| 4,374,608 | 2/1983 | Anderson | 350/96.23 |
| 4,515,435 | 5/1985 | Anderson | 350/96.23 |

FOREIGN PATENT DOCUMENTS

| | | | |
|---|---|---|---|
| 2274052 | 1/1976 | France | 350/96.23 |
| 2326714 | 4/1977 | France | 350/96.23 |
| 1477680 | 6/1977 | United Kingdom | 350/96.23 |

OTHER PUBLICATIONS

Optical Spectra Article, "Communications Spectra", vol. 13, No. 8, 8/79, pp. 35-36.

*Primary Examiner*—William L. Sikes
*Assistant Examiner*—Brian M. Healy
*Attorney, Agent, or Firm*—Brooks Haidt Haffner & Delahunty

[57] ABSTRACT

Telecommunication elements each comprising one or more optical fibers surrounded by one or more layers of a plastic are wrapped with a non-metallic protective layer. The protective layer is enclosed by a metal tube which has at least portions which press into the protective layer so as to provide dimensional stability to the elements and protective layer within the tube. The metal tube may have a cylindrical inner wall or be a corrugated tube, and such tube protects the optical fibers with respect to electrical discharges.

13 Claims, 2 Drawing Figures

OPTICAL FIBER CABLE INCLUDING LAYERS WHICH COMPENSATE FOR THERMAL EXPANSION

This application is a continuation of application Ser. No. 298,940, filed Sept. 3, 1981.

The present invention relates to improvements in optical fiber cables and particularly to the stabilization thereof with respect to the deformation due to thermal variations and with respect to any variations of the dimensions of the plastic materials used in such cables.

BACKGROUND OF THE INVENTION

It is known that an optical fiber cable comprises one or more transmission or telecommunication elements, each one of which is constituted by one or more optical fibers and has one or more protective layers or sheaths, generally made of plastic material. The assembly of said elements usually is protected by suitable materials among which are, preferably, but not exclusively, plastic materials.

It is known that articles manufactured from plastic materials are susceptible to variations in their dimensions because of the discharging of mechanical stresses that are created therein during the course of the working processes.

Moreover, it is also known that the coefficient of thermal expansion of the plastic materials is high and significantly greater than that of metals.

It is equally known that optical fibers are very sensitive to deformations that, even if of a small size, cause increases in the attenuation of the light transmitted therethrough.

For preventing the fiber from being affected by the dimensional variations in said plastic materials, attempts have been made to offset the dimensional variations in said plastic materials by introducing into the optical fiber cable elements which are made of more stable materials, e.g. having both a low coefficient of thermal expansion, as well as a high elastic modulus.

Thus, there have been made optical fiber cables comprising one or more fibers, clad with plastic materials that are joined or wound on an inner longitudinal metallic element, for example, on a steel wire.

However, although this solution is effective from the point of view of dimensional stability, it presents other drawbacks during practice.

Take, for example, a buried cable. In case of an electrical discharge caused by a flash of lightning striking the ground, said discharge can reach the inner metallic element with damage to the fibers that it encounters during the course of discharging itself.

Discharges could also be caused by variations in the electromagnetic field resulting, for example, from transient short circuits in the power transmission lines that are adjacent to an optical fiber.

SUMMARY OF THE INVENTION

It is an object of this invention to overcome these drawbacks set forth hereinbefore, by creating an optical fiber cable which is stabilized with respect to the causes of the deformations, described above, and which does not expose its fibers to the risks of any damage due to lightning or due to said variations in the electrical field.

More precisely, the main object of the invention is an optical fiber cable comprising one or more optical fibers enclosed in at least one sheath of plastic material which form a cable element, said element or an assembly of said elements being surrounded by a protective tube. Said element or assembly of said elements, is wrapped with at least one non-metallic protective layer, the diameter of a hypothetical cylinder circumscribing the said at least one non-metallic protective layer having a greater diameter than the inner diameter of at least portions of said protective tube. Said protective tube is made of a metallic material.

In a preferred embodiment of the optical fiber cable, according to the invention, said metallic material protective tube is constituted by a hollow cylinder having the diameter of its inner surface smaller, throughout its length, than the diameter of a hypothetical cylinder circumscribing said at least one non-metallic protective layer.

In another preferred embodiment, the metallic material protective tube of the optical fiber cable of the invention, is a corrugated sheath, the internal diameter of its transverse sections corresponding to the lowest line of the depressions being smaller that the diameter of the hypothetical cylinder circumscribing the said at least one non-metallic protective layer.

Other objects and advantages of the present invention will be apparent from the following detailed description of the presently preferred embodiments thereof, which description should be considered in conjunction with the accompanying drawings in which:

DETAILED DESCRIPTION OF THE INVENTION

Figure 1:
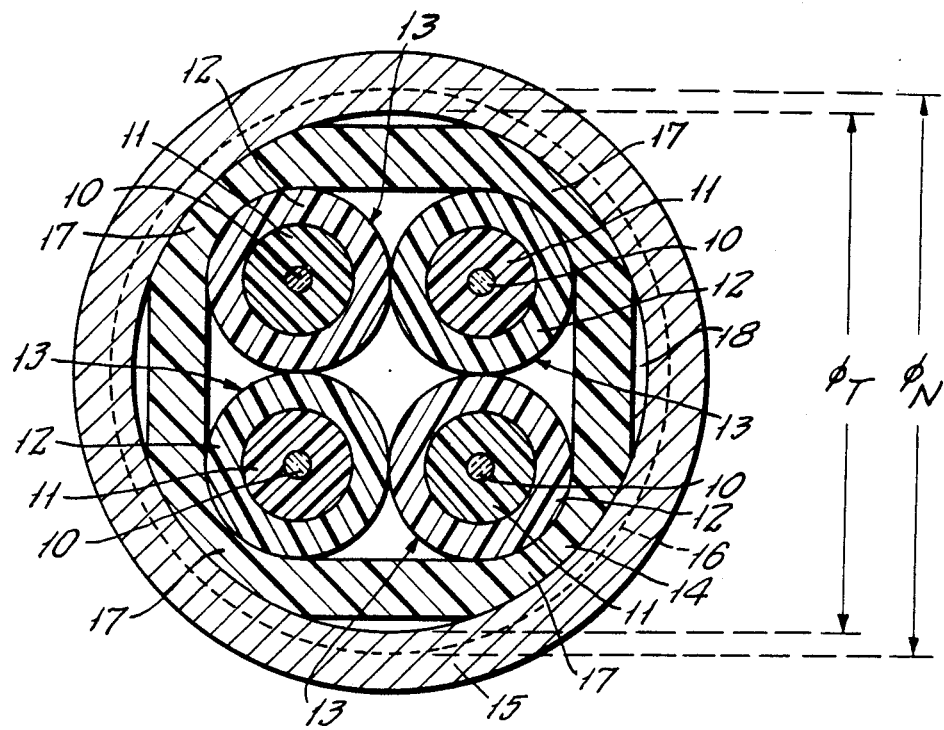
FIG. 1 is a transverse section of an optical fiber cable according to the invention which has a cylindrical protective tube.

The optical fiber cable illustrated in FIG. 1, contains four optical fibers 10, each one of which has two coverings, or adherent sheaths, 11, 12, for forming a telecommunication element 13. A telecommunication element 13 can, however, also comprise a plurality of optical fibers, all surrounded by one or more sheaths.

Preferably, the first sheath 11, is made of a silicone plastic, and the second sheath 12 is made of nylon. The four elements 13, are simply laid-up together, or may be stranded with a slight twist, so as to form a bundle.

Around the assembly or bundle of said several elements 13, there is applied at least one or more non-metallic protective layer 14. Specifically, in the exemplified case, the protective plastic layers 14 may, for example, be plastic tapes wound either helically or longitudinally, with the entire assembly being contained in a protective metal tube 15. However, it is not necessary that the layers be in the form of wound tapes.

The tube 15 is a hollow cylinder which is applied so as to apply pressure to the protective layers 14. In fact, the diameter $\phi_N$ of a hypothetical cylinder 16 circumscribing the protective layers 14, is greater than the diameter $\phi_T$ of the inner surface of the hollow cylinder 15. The difference between the two diameters depends upon the material used for the protective layers 14 and the thickness thereof, the difference being that required to obtain the desired dimensional stability. Although the actual difference used for a given, desired amount of stability is determined empirically, it has been found that the diameter $\phi_T$ should be at least 0.2 millimeters less than the diameter $\phi_N$ and normally would be from 0.2 to about 0.6 millimeters less than the diameter $\phi_N$. In the case of FIG. 1, the compression of the layer 14 at the portions 17 thereof is longitudinally continuous because $\phi_N$ is greater than $\phi_T$, for each transverse section of the optical fiber cable.

Figure 2:
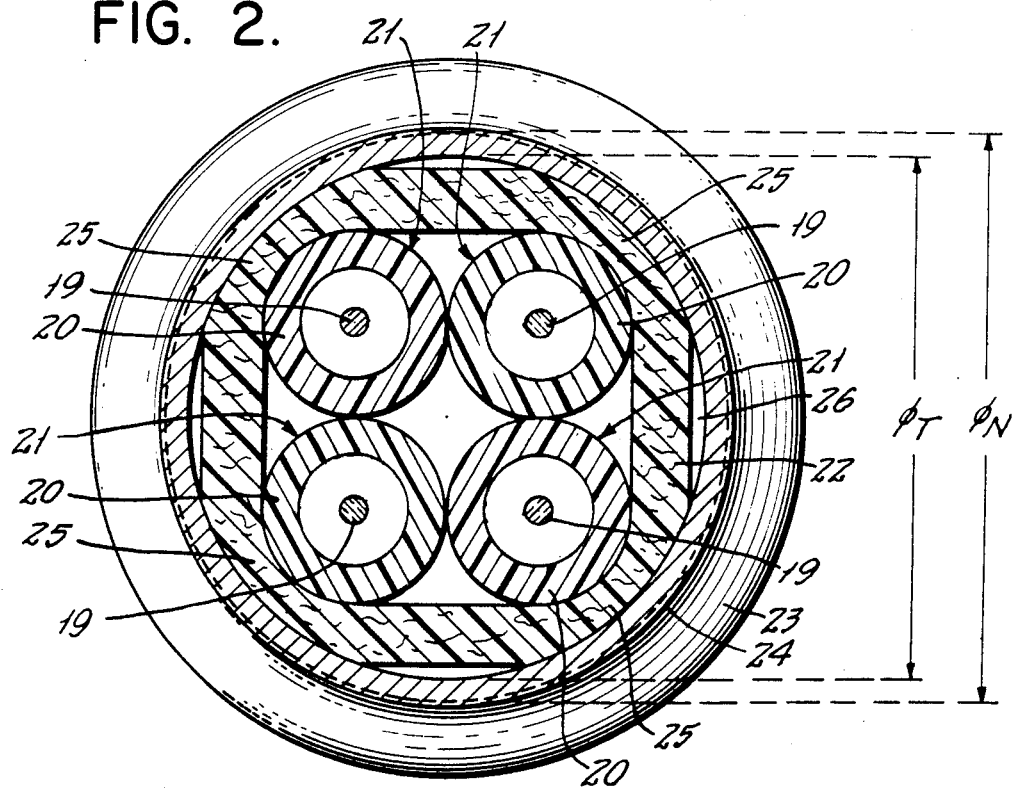
FIG. 2 is a transverse section of an optical fiber cable according to the invention which has a protective tube in the form of a corrugated sheath having annular corrugations.

There can, however, be other embodiments whereby the compression is had only at at least a plurality of separated transverse sections. This is, for example, the case of FIG. 2. FIG. 2, represents an optical fiber cable that comprises four optical fibers 19. Each fiber 19 is loosely contained inside a sheath or tube 20 of a plastic material. The fiber 19, can have a length equal to or greater than the length of the tube 20. The fiber 19, inside the tube 20, constitutes a telecommunication element 21.

The four elements 21 are simply laid-up together or stranded, with a slight twisting, so as to form an assembly or bundle. Around the bundle of said elements there is applied at least one or more non-metallic, protective layers 22, for example, paper tapes. Said paper tapes could be wound helically or longitudinally. The assembly is contained in a protective tube 23.

The tube 23 is a metallic, corrugated sheath 23, with annular type corrugations, applied with pressure on the non-metallic, protective layers 22. The pressure is applied to the layers 22 only at transverse sections corresponding to the valleys or depressions 24 of the tube 23 where the conditions $\phi_N$ is greater than $\phi_T$ occur. For the reasons set forth hereinbefore $\phi_T$ should be at least 0.2 millimeters less than $\phi_N$ and preferably, in the range from 0.2 to about 0.6 millimeters less than $\phi_N$.

In the case of FIG. 2, $\phi_N$ is again the diameter of a hypothetical cylinder 16 circumscribing the non-metallic protective layers 22, and $\phi_T$ is the diameter of the innermost surfaces of the corrugated sheath 23 which correspond to the depressions 24.

FIGS. 1 and 2 are merely illustrative and are not intended to indicate the exact shape of the portions 17 and 25 where the layers 14 and 22 are pressed inwardly by the tubes 15 and 23, respectively. In fact, in practice, the protective layers become pressed inwardly and laterally and occupy parts of the cavities 18, 26 respectively.

The protective tubes 15 and 23 are preferably, but not necessarily, formed out of a welded, longitudinally folded, metallic tape. The form of the protective tube can be of a type which is different from those indicated in the drawing. For example, the corrugated sheath 23 can have helicoidal corrugations instead of annular corrugations. Tapes of iron, copper or aluminum, or even an alloy of these metals, are particularly adapted for forming a protective tube 15 or 23. Other metals that conditions require may also be used.

The number of transmission elements can be one or several, and the fiber or fibers of each said element can be covered by one or more adherent sheaths, or can be loose within a tube as indicated in FIG. 2.

Although it may not be necessary to do so, the interstices inside of the metallic protective tube, between the protective layers and the elements, and/or between the elements, and/or between fibers and covering sheath, can be filled with substances that oppose any migration of moisture. Such substances are known in the art and may be, for example, certain powders, or else viscous substances that are derived from petroleum.

Although preferred embodiments of the present invention have been described and illustrated, it will be apparent to those skilled in the art that various modifications may be made without departing from the principles of the invention.

We claim:

1. An optical fiber cable comprising:

a longitudinally extending telecommunication element or elements, each element comprising at least one optical fiber surrounded by a non-metallic sheath of plastic material and each element being disposed so that the sheath thereof is engageable by a layer of material encircling the element or elements;

a metal protecting sheath around said element or elements with an inner surface which has predetermined diametric dimensions and which is spaced from the sheath of the element or elements, said metal protecting sheath having a temperature coefficient of expansion less than the temperature coefficient of expansion of the plastic material of the sheath or sheaths and being longitudinally and peripherally continuous and in a cross-section perpendicular to the longitudinal axis thereof, having the shape of a closed geometric figure, whereby the metal protecting sheath is resistant to radial expansion and longitudinal extension by reason of forces applied thereto other than forces due to temperature changes;

and a layer of a non-metallic material which is compressible but which is resistant to distortion by forces applied thereto and which is in the space between said inner surface of said metal protecting sheath and the sheath or sheaths of the element or elements, said layer having its inner surface frictionally engaging each sheath or sheaths around the element or elements with portions of the inner surface thereof applying radial forces to the sheath or sheaths and having at least portions of its outer surface in engagement with the inner surface of said metal protecting sheath and said layer having an outer surface, diametric dimension which in the absence of said metal protecting sheath, is greater than the diametric dimensions of at least portions of said inner surface of said metal protecting sheath by at least 0.2 millimeters, whereby said layer is radially compressed by said portions of said inner surface of said metal protecting sheath and dimensional changes of the sheath or sheaths around the fiber or fibers are opposed by the forces applied thereto through said layer by said metal protecting sheath and dimensional changes of the sheath or sheaths around the fiber or fibers due to changes in temperature are reduced as compared to cables without said layer and said metal protective sheath.

2. An optical fiber cable as set forth in claim 1 wherein said layer is homogeneous.

3. An optical fiber cable as set forth in claim 1 wherein said layer consists of a wrapping of a tape of the same material throughout its length.

4. An optical fiber cable as set forth in claim 3 wherein said tape is folded longitudinally around said sheath or sheaths around said fiber or fibers.

5. An optical fiber cable as set forth in claim 3 wherein said tape is wound helicoidally around said sheath or sheaths around said fiber or fibers.

6. An optical fiber cable as set forth in claim 4 or 5 wherein said tape is a paper tape.

7. An optical fiber cable as set forth in claim 4 or 5 wherein said tape is a tape of a plastic material.

8. An optical fiber cable as set forth in claim 1 wherein said metal protecting sheath is made of a metal selected from the group consisting of iron, copper, aluminum and alloys thereof.

9. An optical fiber cable as set forth in claim 1 wherein said metal protecting sheath is a metal tape folded longitudinally around said layer and having its longitudinal edges welded together.

10. An optical fiber cable as set forth in claim 1 wherein said metal protecting sheath has a cylindrical inner surface and said cylindrical inner surface has a diameter which is less than an outer surface diameter of said layer by an amount in the range from 0.2 millimeters to about 0.6 millimeters.

11. An optical fiber cable as set forth in claim 1 wherein said metal protecting sheath has corrugations and said portions of the inner surface of said metal protecting sheath are the inner surface of said corrugations.

12. An optical fiber cable as set forth in claim 11 wherein said inner surfaces of said corrugations have diameters less than said outer surface diameter of said layer by an amount in the range from 0.2 millimeters to about 0.6 millimeters.

13. An optical fiber cable as set forth in claim 1 wherein each non-metallic sheath surrounding the optical fiber or fibers has its inner surface closely surrounding and contacting the optical fiber or fibers within the non-metallic sheath and throughout the lengths of the fiber or fibers.

* * * * *